United States Patent

[11] 3,568,721

[72] Inventors Robert J. Ross;
Jack C. Kelley, Gonzalez, La.
[21] Appl. No. 808,272
[22] Filed Mar. 18, 1969
[45] Patented Mar. 9, 1971
[73] Assignee Reintjes Industrial Services of Louisiana, Inc.
Gonzales, La.

[54] TUBE REPAIR TOOL
3 Claims, 5 Drawing Figs.

[52] U.S. Cl. .................................................... 138/97,
81/72, 29/401
[51] Int. Cl. ........................................................ F16l 55/18
[50] Field of Search............................................ 138/97;-
81/(Inquired); 249/183; 25/1F, 127C, 128D;
29/401 (Cursory)

[56] References Cited
UNITED STATES PATENTS
2,229,264 1/1941 Wertz............................ 138/97X
2,232,199 2/1941 Bald.............................. 138/90X
2,543,954 3/1951 Barber.......................... 138/97UX
FOREIGN PATENTS
826,429 1/1960 Great Britain................ 138/90

Primary Examiner—Laverne D. Geiger
Assistant Examiner—Richard J. Sher
Attorney—Schmidt, Johnson, Hovey, Williams and Chase ABSTRACT: A tool for repairing graphite tubes of the type used in bundles in chemical processing equipment such as heat exchangers, without the necessity of removing the tube from the piece of processing equipment, the tool comprising an elongated, hollow sleeve insertable within the tube to be repaired; a pipe extending longitudinally of the hollow sleeve and having a central passage formed therein; a pair of spaced-apart expansible members carried by a portion of the pipe which extends beyond the distal end of the sleeve when the tool is in use; the sleeve and the pipe being relatively rotatable whereby said members may be radially expanded into engagement with the interior of the tube to be repaired to cooperate therewith to define a chamber. The pipe is provided with a nipple at one end so that adhesive material may be introduced into the central passage thereof and the other end of the pipe has at least one outlet hole formed therein, the outlet hole being in selective communication with openings formed in a lantern ring which is carried by the pipe between said expansible members, in order that adhesive material introduced into the pipe may be delivered against the tube to be repaired.

PATENTED MAR 9 1971

3,568,721

INVENTORS
Robert J. Ross
Jack C. Kelley

BY Schmidt, Johnson, Hovey,
Williams & Chase
ATTORNEYS

TUBE REPAIR TOOL

It is the most important object of this invention to provide a tool for repairing graphite tubes of the type used in chemical processing equipment, which tubes are fragile and often subject to cracks and breaks as a result of the continuing use thereof in such equipment. It is difficult and expensive to remove individual tubes from a large bundle thereof as is commonly found in such equipment, and thus the present tool has been devised to permit repair of such tubes without the removal thereof from the equipment, thus avoiding the necessity of shutting down expensive and complex machinery.

To this end there is provided a tool having an elongated sleeve which may be of variable length depending upon the nature and length of the tubes to be repaired, the sleeve receiving in longitudinally telescoping relationship a pipe having a central passage, the sleeve and the pipe being relatively rotatable whereby to expand, in a radial direction, a pair of spaced-apart, expansible members which are carried by a portion of the pipe protruding beyond the distal end of the sleeve.

Another important object is to provide means for delivering adhesive through the tool and to the point of break on the tube to be repaired, such means including a nipple at the proximal end of the passage through the pipe and at least one outlet hole from the passage in the portion of the pipe extending beyond the sleeve, said hole being in selective communication with openings in a lantern ring which is rotatably carried by said portion of the pipe whereby said hole and openings may be aligned to permit delivery of the adhesive material through the passage in the pipe and into a chamber defined by the pair of expansible members and the interior of the tube to be repaired.

Other objects will include details of construction which will become apparent from the following specification and accompanying drawings, wherein.

Figure 3:
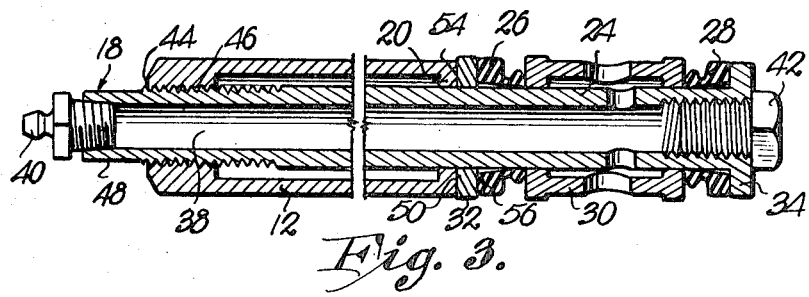
FIG. 3 is an enlarged fragmentary, condensed sectional view taken along line 3–3 of FIG. 1.
Figure 1:
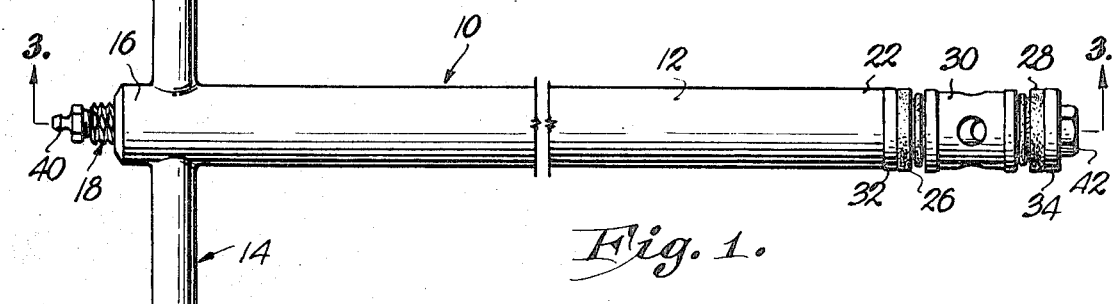
FIG. 1 is a fragmentary, top plan view of the tube repair tool.
Figure 4:
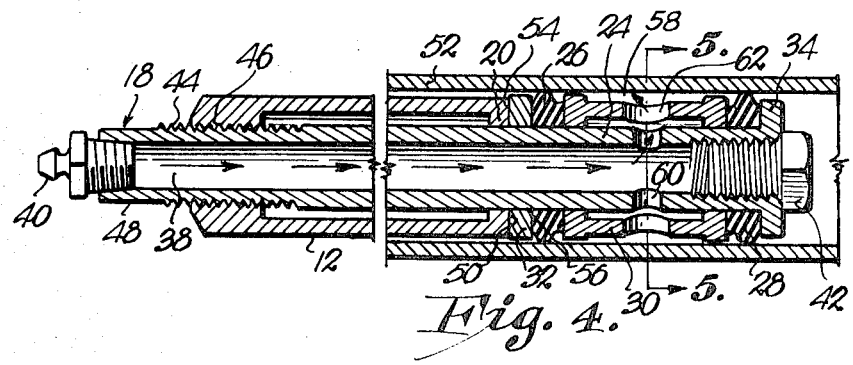
FIG. 4 is a sectional view similar to that of FIG. 3 but showing the tool within the tube to be repaired and in condition for introduction of the adhesive material.
Figure 2:
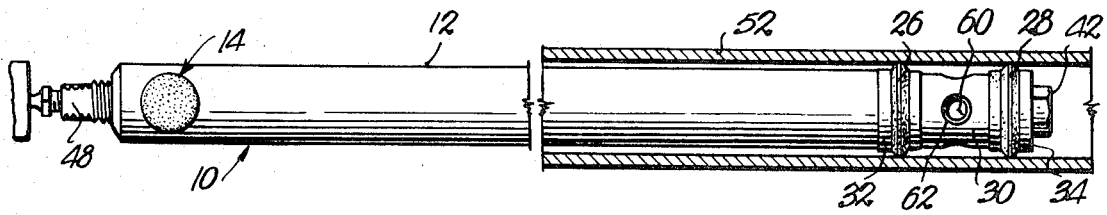
FIG. 2 is a fragmentary, side elevational view thereof showing the tool inserted within a tube to be repaired.
Figure 5:
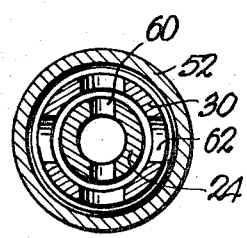
FIG. 5 is a sectional view taken along line 5–5 of FIG. 4.

The tube repair tool 10 has, as its essential components, an elongated, hollow sleeve 12, which sleeve has a handle 14 formed at one end 16 thereof, there being a delivery pipe 18 received within the hollow sleeve 12, said pipe 18 extending outwardly from the cap 20 at the other end 22 of sleeve 12 whereby a portion 24 of the pipe 18 extends beyond said other end 22 of the sleeve 12.

Portion 24 of pipe 18 carries a pair of spaced-apart, expansible members 26 and 28, said members 26 and 28 being maintained in spaced-apart relationship by a lantern ring 30 rotatably carried by portion 24 of pipe 18. Said portion 24 also carries, adjacent end 22 of sleeve 12, a floating ring 32 in the nature of a washer. A fixed annular flange 34 is formed at the distal end 36 of the pipe 18.

Pipe 18 has a central passage 38 which extends the length thereof, one end of passage 38 having a nipple 40 in communication therewith, said nipple being in the nature of a fitting having a passage therethrough whereby a viscous material may be introduced therethrough and into the passage 38. The other end of passage 38 is closed as by a plug 42 in the nature of a bolt which is threaded into said other end of the passage 38.

Pipe 18 is provided with a plurality of exterior threads 44 at the proximal end thereof, that is the end adjacent nipple 40, such end being the proximal end when the tool is in use, the threads 44 being complementally received by threads 46 which are formed in the one end 16 of the sleeve 12 whereby the sleeve 12 and the pipe 18 may be rotated relative to one another. To aid in such rotation the end of pipe 18 which is adjacent nipple 40 is filed to provide a series of flats 48 which may be engaged by a wrench or the like to either rotate the pipe 18 or hold the same against rotation as sleeve 12 is rotated as by handle 14 for a purpose hereinafter described.

Portion 24 of pipe 18 carries the various members hereinabove described in such a manner that, upon relative rotation of the sleeve 12 and pipe 18 in one direction, expansible members 26 and 28 will be compressed between a shoulder 50 defined at the other end 22 of sleeve 12 and the flange 34 which is at the distal end of the pipe 18 when tool 10 is in use. In use, the tool 10 is first inserted within a graphite tube 52 which is to be repaired, the tube 52 having a crack, break or other fissure or fracture therealong at a point which is inaccessible without removing the tube from its position within a bank or bundle of such tubes. The exact position of the point to be repaired is determined in advance and a tool 10 with a sufficiently long sleeve and pipe is utilized whereby the same may be inserted in the tube 52 in such a manner as to place the expansible members 26 and 28 in straddling relationship to the point to be repaired and with said point at the center of lantern ring 30.

Once the tool 10 has been so positioned, the handle 14 may be grasped and turned to rotate sleeve 12 while a wrench is applied to the flats 48 to hold pipe 18 against rotation. Such relative rotation rotates threads 46 with respect to threads 44, thus causing the ring 32 to be driven along portion 24 toward the flange 34. It will be noted that one face 54 of the ring 32 is in engagement with shoulder 50 while the other face 56 of the ring 32 is in engagement with expansible member 26. Likewise, flange 34 which is formed as a part of the pipe 18, is in engagement with expansible member 28, and the members 26 and 28 are spaced apart by the rigid lantern ring 30, all to the end that as ring 32 is driven toward flange 34 by virtue of the relative rotation of sleeve 12 and pipe 18, the members 26 and 28 will be compressed and, as such members are formed of rubber or a similar expansible material they will expand in a radial direction and move their peripheral edges into engagement with the interior of the tube 52 which is to be repaired. Once expansible members have been so expanded they cooperate with the interior of the tube 52 to define a chamber 58, said chamber 58 encompassing the area of the tube which is to be repaired.

Subsequent to the creation of the chamber 58 an adhesive material is introduced thereinto as by delivering the same to nipple 40 by a grease gun or similar pressure equipment whereby the adhesive material is forced along passage 38 and out of one of the outlet holes 60 formed in portion 24 of the pipe 18, and thence out of one of openings 62 formed in the sidewall of the lantern ring 30 whereby said adhesive may move into engagement, under pressure, with the wall of the tube 52 to be repaired.

Prior to the relative rotation of sleeve 12 and pipe 18, lantern ring 30 is rotatably carried by portion 24 of the pipe 18, so that prior to the insertion of the tool within the tube 52, the openings 62 in the lantern ring may be placed in aligned relationship with respect to the hole or holes in the pipe 18 to insure that adhesive material traveling along passage 38 will freely pass out of the outlet holes 60, through the openings 62 and into the chamber 58. It will also be appreciated that the expansion of members 26 and 28 may be achieved by the rotation of the handle 14 and sleeve 12, as described, or by rotation of pipe 18 relative to sleeve 12, either type of rotation achieving a compression of the members 26 and 28.

Once the adhesive material has been delivered through the tool and into the chamber 58 the members 26 and 28 are retracted by rotating the sleeve 12 in an opposite direction to pipe 18, thereby releasing the pressure on said members. The tool is then moved slightly forward within the tube 52 and subsequently slowly withdrawn therefrom, the members 26 and 28 serving to wipe the interior surface of the tube 52 as the tool is withdrawn and thereby smooth out or remove any excess adhesive which might have been delivered into the chamber 58. The remaining adhesive of course, passes into any cracks, fissures or other types of breaks which are encompassed within the chamber 58 and, as it is a very quick-setting adhesive, serves to repair said breaks whereby the tube may be shortly placed into operation.

It will be appreciated that tubes of any length and diameter may be repaired with the above described tool 10, it only being necessary that the size and length of the various components be varied to accommodate the tool 10 to different sized tubes such as 52. Likewise, it is within the scope of this invention that sleeve 12 and pipe 18 could be of a flexible nature whereby arcuate tubes could be repaired without the necessity of removing the same from the bank or bundle within the piece of processing equipment.

We claim:
1. A tube repair tool comprising:
   an elongated, hollow sleeve insertable within the tube to be repaired;
   handle means at one end of the sleeve;
   a pipe extending longitudinally within said hollow sleeve, said sleeve and said pipe being rotatable relative to one another, a portion of said pipe extending from the other end of said sleeve;
   a pair of spaced-apart, expansible members carried by said portion of the pipe;
   means for expanding said members into engagement with the interior of the tube to be repaired, said means including a lantern ring carried by said portion of the pipe and between said expansible members and means for retaining said expansible members with respect to said ring whereby upon relative rotation of the pipe and the sleeve said expansible members are compressed to thereby cause radial expansion thereof into engagement with the interior of the tube to be repaired, the expanded members and said tube cooperating to define a chamber; and
   a passage formed centrally of the pipe, there being repair material introducing means in communication with the proximal end of the passage when the tool is in use and at least one outlet hole at the distal end portion of the pipe and in communication with said chamber.

2. A tube repair tool as set forth in claim 1, said lantern ring having a plurality of openings formed in the sidewall thereof, said openings being in selective communication with said hole whereby to permit material which is introduced into said passage through said introducing means to pass out of said hole, through said openings and into the chamber.

3. A tube repair tool as set forth in claim 2, said lantern ring being rotatably carried by said portion of the pipe whereby the relationship of said openings and said hole may be determined prior to expansion of said members.